US005095600A

United States Patent [19]

Allan

[11] Patent Number: 5,095,600

[45] Date of Patent: Mar. 17, 1992

[54] PAVING BREAKERS AND SUPPORTS THEREFOR

[76] Inventor: David T. Allan, 9 Broomhill Dr., Glasgow, United Kingdom

[21] Appl. No.: 503,527

[22] Filed: Apr. 2, 1990

[30] Foreign Application Priority Data

Apr. 1, 1989 [GB] United Kingdom ................. 8907410

[51] Int. Cl.[5] .............................................. B23D 79/02

[52] U.S. Cl. .................................. 29/81.16; 29/81.11; 173/162.2

[58] Field of Search ............................. 173/162.1, 139; 29/81.01-81.17; 56/DIG. 10

[56] References Cited

U.S. PATENT DOCUMENTS

| | | | |
|---|---|---|---|
| 2,525,250 | 10/1950 | Westphal | 29/81.05 |
| 2,562,899 | 8/1951 | Finn | 29/81.16 |
| 2,787,943 | 4/1957 | Browning | 29/81.15 |
| 4,313,294 | 2/1982 | Martenas | 56/DIG. 10 |
| 4,523,361 | 6/1985 | Dummermuth | 29/81.05 |
| 4,673,043 | 6/1987 | Greppmair | 173/139 |
| 4,920,732 | 5/1990 | Lee et al. | 56/DIG. 10 |

*Primary Examiner*—Frank T. Yost
*Assistant Examiner*—Scott A. Smith
*Attorney, Agent, or Firm*—Ratner & Prestia

[57] ABSTRACT

There is described a paving breaker wherein vibrational forces arising from reciprocation of the breaker are reduced at the breaker handles by removing the conventional direct attachment of the handles to the breaker, and instead resiliently coupling the handles to the working bit. There is also described a support for a paving breaker said support having a powered lift provided with at least one ground engageable wheel. The powered lift is under the control of a manually operable control mounted in the support.

8 Claims, 7 Drawing Sheets

PAVING BREAKERS AND SUPPORTS THEREFOR

This invention relates to paving breakers and the like, by which is meant the class of hand-held power-driven reciprocating tools which incorporate a replaceable chisel bit or spike for breaking up concrete or tarmacadam paving, and for rock drilling and demolition work in general. Alternative bits may be substituted for other purposes; for example a broad-bladed chisel or spade bit can be employed in breaking down masses of clay to assist excavation.

Paving breakers have customarily been powered by compressed air, though some modern versions may alternatively be hydraulically powered. Paving breakers (however powered) employ a linearly reciprocating piston-driven anvil which rapidly and repeatedly hammers on the end of the chisel bit or other working bit in use. The reciprocating anvil and its driving piston are contained within a housing conventionally provided with a pair of laterally extending handles by which the paving breaker is manipulated. In use of a typical paving breaker, the operator holds onto the conventional handles and the working fluid (air or oil) creates reactive forces while reciprocating the piston within the casing. In turn, these reactive forces reciprocate the casing and the handles, resulting in more or less severe vibrating forces being applied to the operator through his hands and arms. Such vibration can be unpleasant, and may be hazardous to health.

Use of a paving breaker or other heavy power tool usually requires considerable physical exertion by the operator in lifting or manoeuvring the tool. The need for such exertion can reduce the effective speed of operation of the tool, and can also reduce the length of time for which the tool can be operated prior to exhaustion of the operator.

It is therefore an object of the invention to provide an improved paving breaker, and an improved support therefor.

According to a first aspect of the invention, there is provided a paving breaker having a housing, a linearly reciprocating anvil mounted in the housing, a working bit mounted in the housing and arranged to be contacted by said anvil, and a handle for use by an operator, vibrational forces arising from reciprocation of the breaker housing being decoupled from the breaker handles resiliently coupling the handle to the working bit. Preferably, a pair of handles arranged in similar positions to the conventional handles are connected through extension pieces to a rubber bush clamped around the working bit.

According to a second aspect of the invention, there is provided a support for a paving breaker or other heavy power tool, said support comprising a body member provided with powered lifting means mounting at least one ground-engageable wheel movable relative to the body member by operation of said powered lifting means under the control of a manually operable control comprised in the support, tool coupling means by which a heavy power tool can be coupled to the support, and at least one manually engageable handle.

The support in general, and preferably the tool coupling means in particular, preferably incorporate vibration clamping means and/or vibration isolating means by which vibration arising from operation of the tool is decoupled from said handle.

Said powered lifting means may comprise a piston-and-cylinder assembly, in which case the cylinder may constitute or be integral with said body member.

Said powered lifting means is preferably provided with a motion damper to inhibit over-rapid movement; if said lifting means is operated by fluid pressure, the motion damper may comprise a fluid throttle or fluid flow restrictor disposed to act upon operating fluid passing to or from the lifting means.

Said support preferably incorporates a wheel brake arranged to operate on the ground-engageable wheel to cause controlled braking of said wheel; if said lifting means is operated by fluid pressure, said wheel braker is preferably likewise operable by fluid pressure.

Embodiments of the present invention will now be described, by way of example, with reference to the accompanying drawings, in which.

Figure 1:
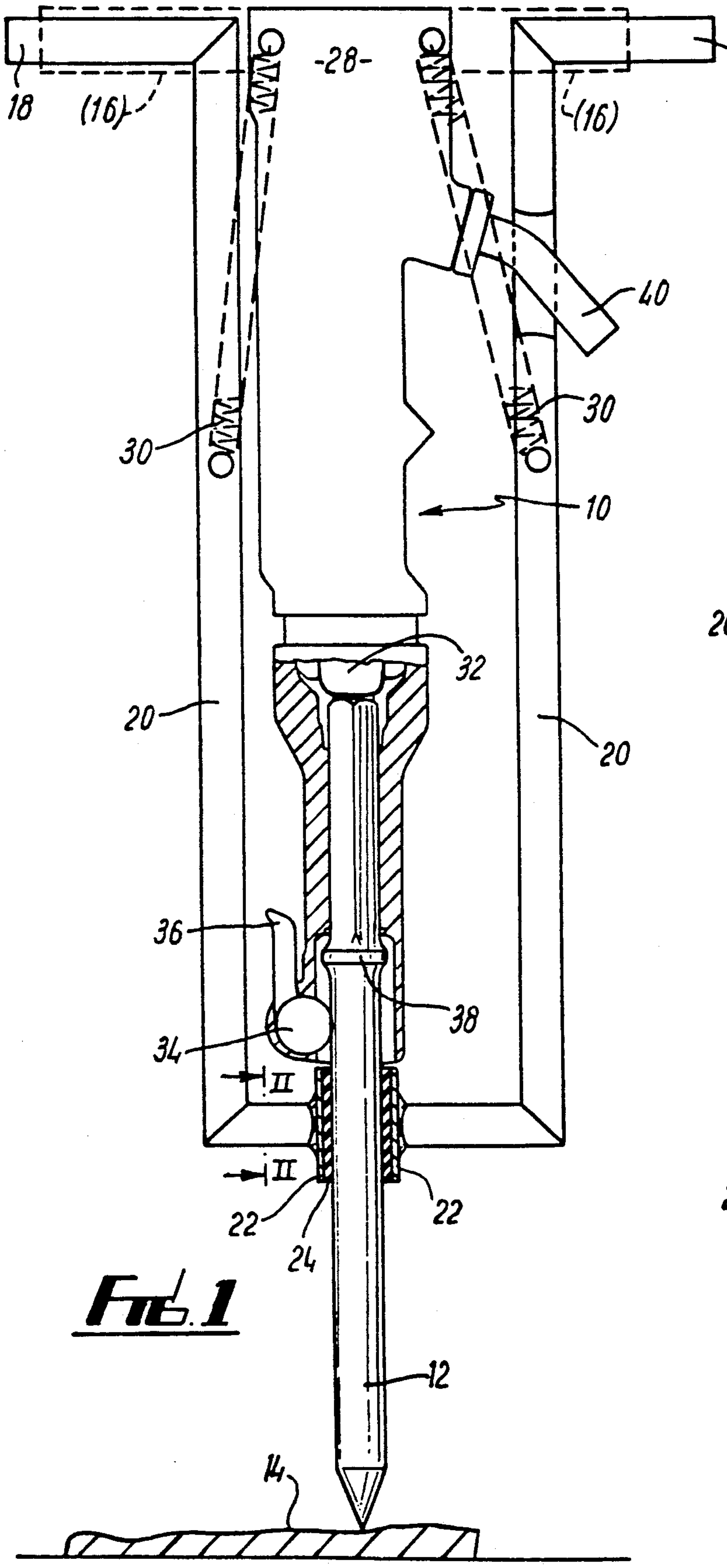
FIG. 1 is a schematic elevation of a first embodiment of the invention.

Referring first to FIG. 1, a conventional pneumatic paving breaker 10 is shown fitted with a conventional hexagonal chisel bit 12 whose points is resting on paving 14 being broken up by hammer action. In its normal configuration, the breaker 10 would be manipulated by a pair of handles 16 (shown in dotted outline) projecting laterally from the top of the casing of the breaker 10.

However, in accordance with the invention, the normal handles 16 are removed, and replaced by a pair of laterally projecting handles 18. The handles 18 are coupled to the chisel bit 12 by respective L-shaped extension pieces 20 fabricated of welded steel tubes. Each extension piece 20 terminates in a welded-on clamp half 22 (detailed in FIGS. 2 and 3).

The chisel bit 12 is sleeved in a rubber bush 24 located immediately below the body of the breaker 10. II The clamp halves 22 are tightly secured around the rubber bush 24 by nut and bolt fasteners 26. The extension pieces 20 are thereby secured to the chisel bit 12, and consequently the handles 18 are resiliently coupled to the chisel bit 12 through the intermediary of the rubber bush 24. It is to be noted that the handles 18 are not directly or rigidly attached to the body of the breaker 10 as the normal handles 16 would be.

The backhead 28 of the breaker 10 is coupled to the extension pieces 20 by a pair of tension springs 30 to assist the weight of the breaker 10 in holding the breaker anvil 32 against the top of the chisel bit 12. The anvil 32 is prevented from retracting further into the body of the breaker 10 by an internal restraining face (not shown).

The chisel bit 12 is positively retained within the end of the breaker 10 by means of a retainer 34 which can be opened and closed by an operating lever 36. While breaker weight retains the chisel bit 12 when resting as shown in FIG. 1, a collar 38 on the chisel bit 12 engages the retainer 34 (when closed) to ensure positive retention of the chisel bit 12 when the bit 12 is jammed into and being pulled out of the workpiece 14.

A conventional lever-operated air valve (not shown) is attached to one of the handles 18 and coupled by a short length of flexible pipe or hose to the normal air inlet 40 of the breaker 10 to control breaker operation in the normal manner.

Figure 2:
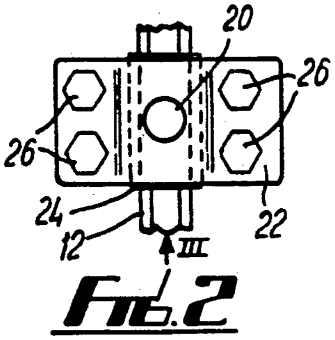
FIG. 2 is a fragmentary view on the line II—II in FIG. 1.
Figure 3:
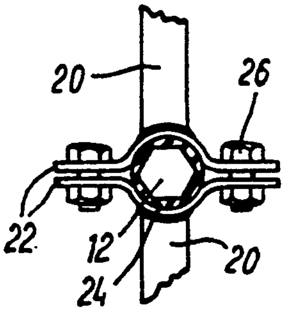
FIG. 3 is a fragmentary view in the direction III in FIG. 2.

By decoupling the handles 18 from the breaker 10 as shown in FIGS. 1 to 3, and by adopting the illustrated resilient coupling of the handles 18 to the chisel bit 12 via the rubber bush 24, the breaker body 10 can undergo vertical reciprocation while the chisel bit 12 remains relatively stationery in contact with the workpiece 14. Thus, the main source of vibration is decoupled from the operator. The tension springs 30 provide the force which the operator would normally apply directly to the breaker body 10 by means of the directly connected handles 16 in the conventional configuration.

Figure 4:
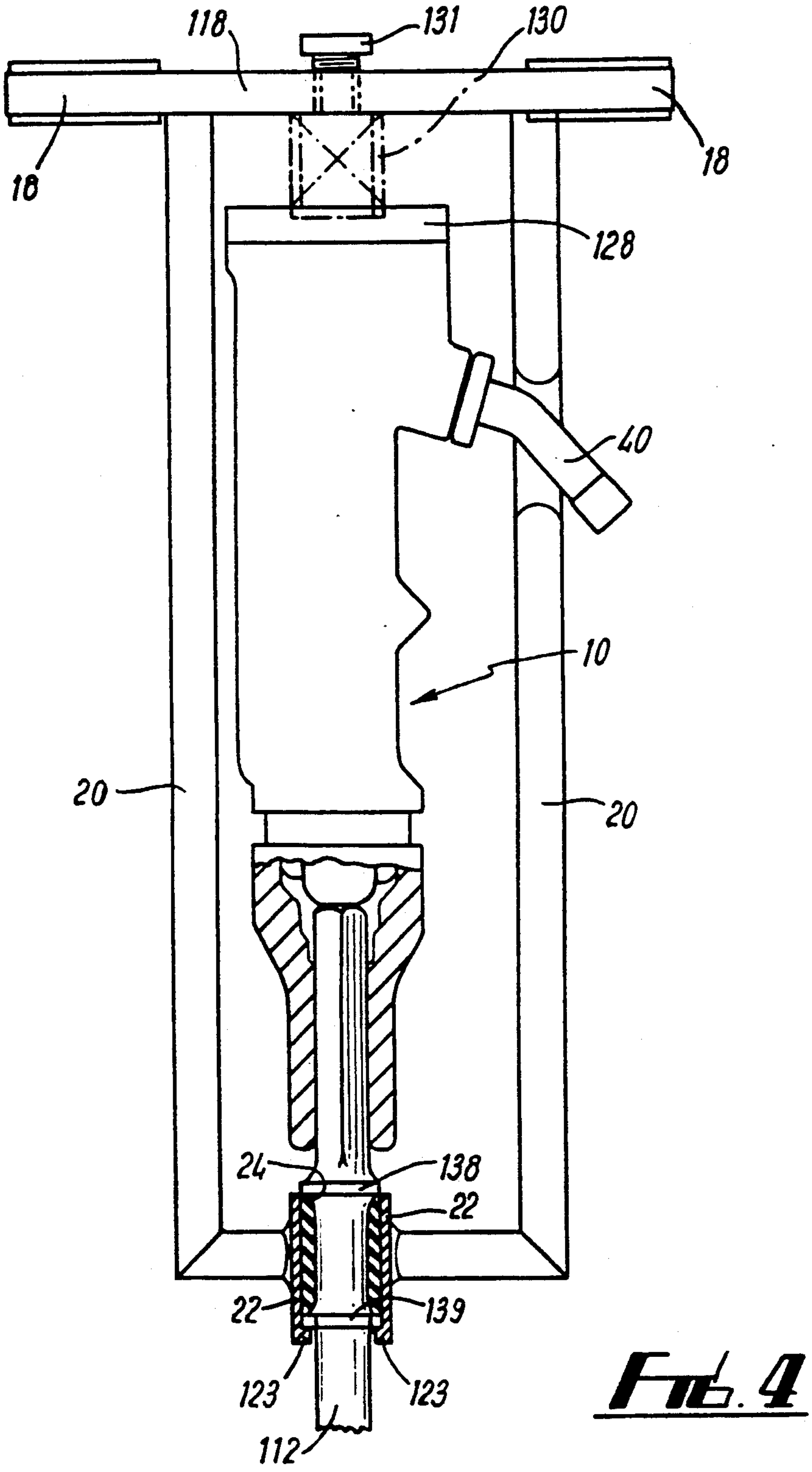
FIG. 4 is a schematic elevation of a second embodiment of the invention.

FIG. 4 illustrates a second embodiment which is a modification of the first embodiment of FIGS. 1 to 3. Those parts of the second embodiment which are common to the first embodiment are given the same reference numerals in FIG. 4 as in FIGS. 1 to 3.

The principal modification of the second embodiment relative to the first embodiment is that the chisel bit 12 is replaced by a modified chisel bit 112 having upper and lower collars 138 and 139. The rubber bush 24 is fitted between these two collars 138 and 139 prior to application and tightening of the clamp halves 22. The clamp halves 22 are downwardly extended to support integral inturned lower end flanges 123. This arrangement eliminates any tendency for the clamps 22 to move up the chisel bit 112 during operation. (The retainer 34 and its operating lever 36 can be eliminated as redundant in the second embodiment).

Further optional modifications in the second embodiment can consist of replacing the tension springs 30 (FIG. 1) with a compression spring 130. The compression spring 130 fits in a central recess in a modified backhead 128, and reacts against a cross-piece 118 whose outer ends constitute the handles 18. A plate in the centre of the cross-piece 118 carries an adjusting screw 131 by which the force exerted by the compression spring 130 can be varied in order to achieve optimum vibration reduction.

As an alternative to the clamp halves 22 being rigidly welded to the horizontal portions of the L-shaped extension pieces 20, their mutual connections may be pivoted working on a common horizontal axis co-axial with these horizontal portions. Thus, by removing or sufficiently slackening the spring adjusting screw 131 as to separate the spring 130 from its recess in the backhead 128, the cross-piece 118 and the handle extension pieces 20 can be pivoted around the horizontal axis through the clamp halves 22 to leave the breaker body 10 free of surrounding framework. The breaker body 10 can then readily be lifted off the end of the chisel bit 112, leaving the bit 112 free to be unclamped and easily replaced. This procedure is reversed to return the breaker to its operating configuration with the new working bit fitted, with minimum overall time required for the bit-changing operation.

The compression spring 130 may be replaced by a piston and cylinder combination which is internally pressurised with a fluid, such as the pressurised working fluid employed to power the breaker.

The invention may also be applied on other, and possibly smaller, fluid powered tools, for example chipping hammers, clay diggers, and other reciprocating and/or vibratory equipment.

Figure 5:
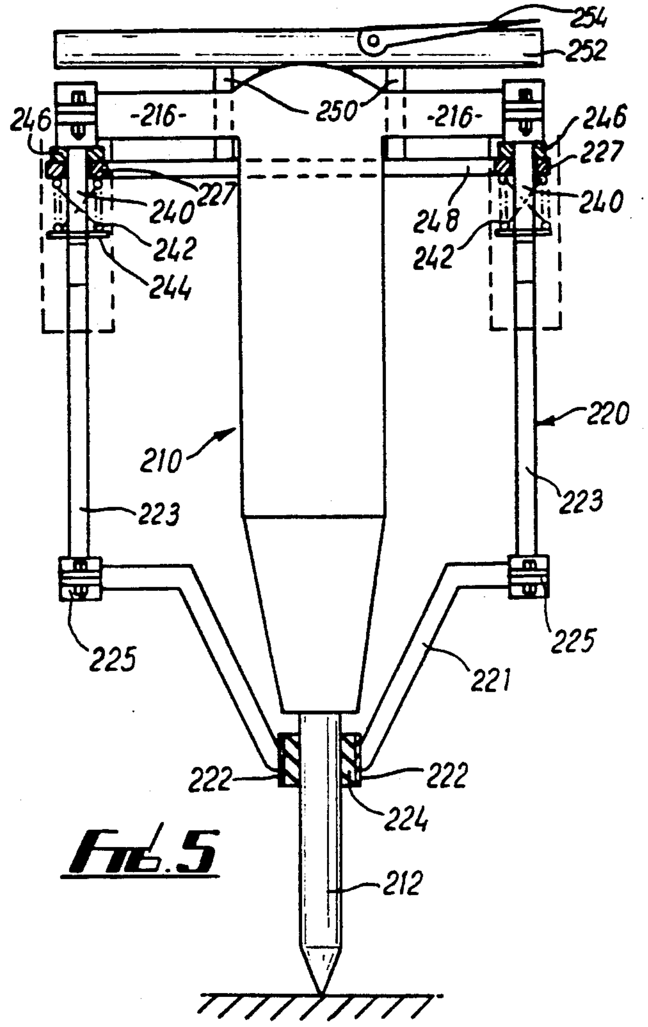
FIG. 5 is a schematic elevation of a third embodiment of the invention.
Figure 6:
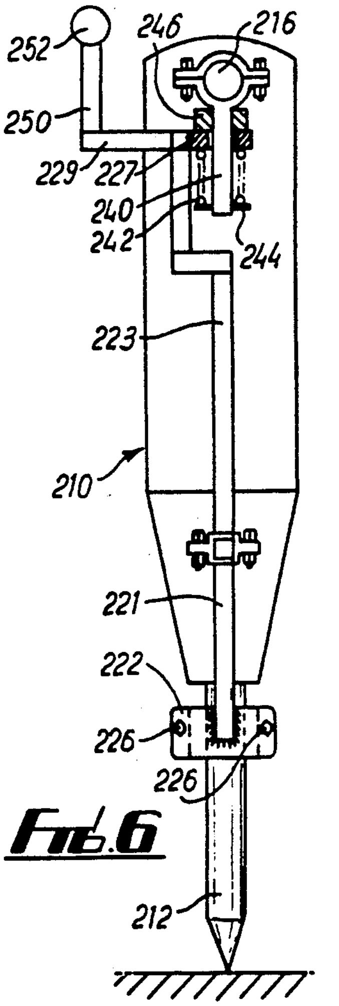
FIG. 6 is an end elevation of the third embodiment.
Figure 7:
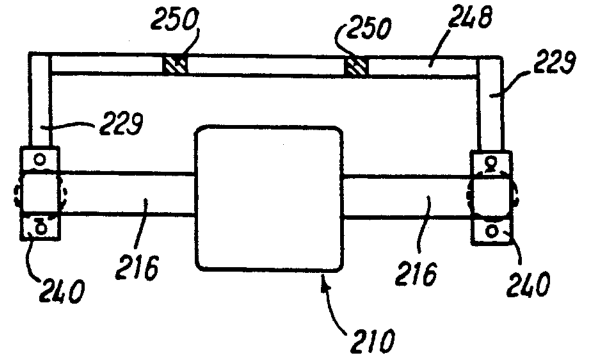
FIG. 7 is a plan view of the third embodiment.

Referring now to FIGS. 5, 6 and 7, these show a third embodiment in the form of a "universal frame" designed to be fitted to a wide range of paving breakers for their operation with a high measure of vibration decoupling.

A paving breaker 210 is schematically depicted in FIGS. 5, 6 and 7, and is shown fitted in a frame 220. The frame 220 is fully adjustable, and consists of a lower transverse frame section 211, plus two upright side frame sections 223. The transverse frame section 221 is clamped to the breaker bit 212 by a rubber bush 224 within clamp halves 222 tightly secured by nut and bolt fasteners 226. The upright frame sections 223 are secured to suitable locations on the transverse frame section 221 by clamps 225.

The upper end of the frame 220 is resiliently clamped to the breaker handles 216 by an arrangement that will now be described in detail. A spigot 240 is clamped t the outer end of each breaker handle 216 so as to project downwards parallel to the long axis of the breaker 210 and its bit 212. The upper ends of the upright frame section 223 are rearwardly cranked (see FIG. 7) to clear the downwardly projecting spigots 240. Forward projections 227 on the upper ends of the upright frame sections 223 ring the downwardly projecting spigots 240 without directly contacting the spigots 240. A compression spring 242 is fitted between the underside of each projection 227 and a flange 244 secured to the lower end of each spigot 240. A rubber toroid 246 is fitted between the upper side of each projection 227 and the clamp at the upper end of each spigot 240. The springs 242 resiliently link upward movement of the breaker 210 relative to the frame 220 (compare with the springs 30 in FIG. 1). The rubber toroids 246 provide resilient limitation on the downward rebound movement of the breaker 210 relative to the frame 220.

Rearward projections 229 opposite the forward projections 227 bring the upper ends of the upright frame sections 223 rearwards to join a crossbar 248 completing the loop structure of the frame 220 when II fully assembled. A pair of uprights 250 on the crossbar 248 provide attachments between the frame 220 and a transverse handle 252 (not visible in FIG. 7) by which an operator holds the frame 220 and the resiliently coupled breaker 210 in use thereof. The handle 252 incorporates a valve operating lever 254 by which operation of the breaker 210 is controlled in the conventional manner.

Figure 8:
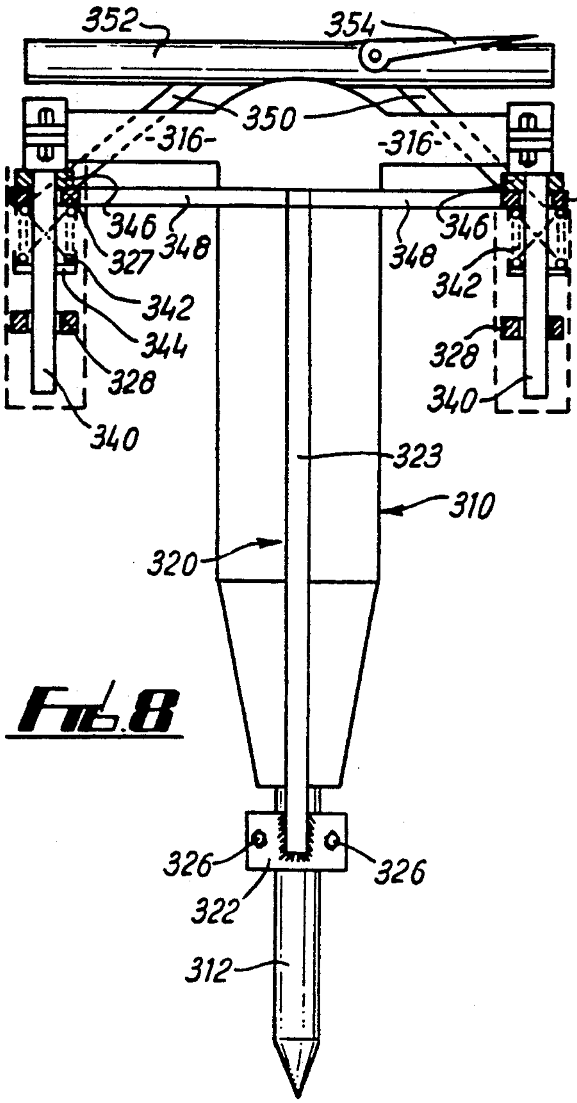
FIG. 8 is a schematic elevation of a fourth embodiment of the invention.
Figure 9:
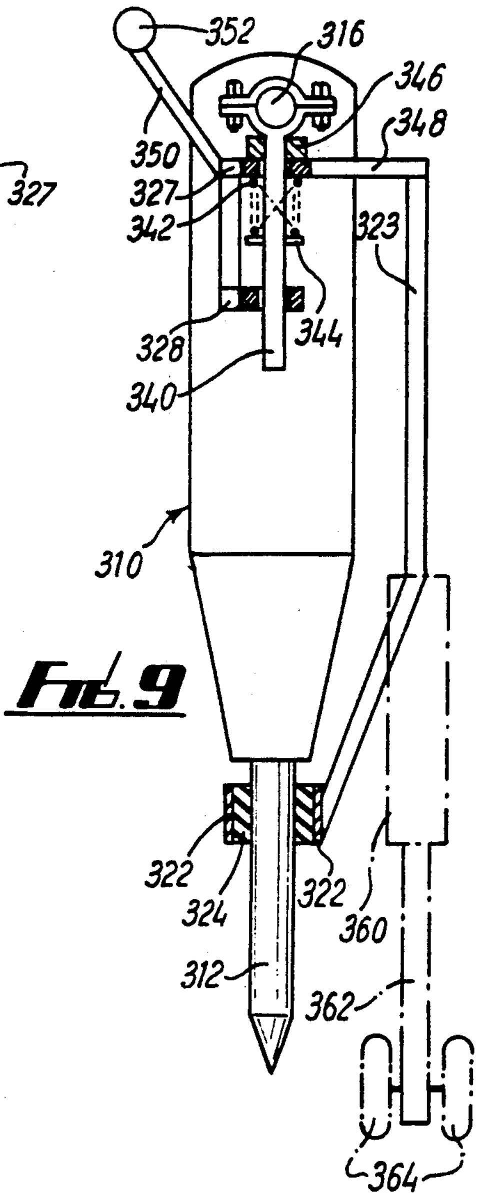
FIG. 9 is an end elevation of the fourth embodiment and showing a further modification in outline.
Figure 10:
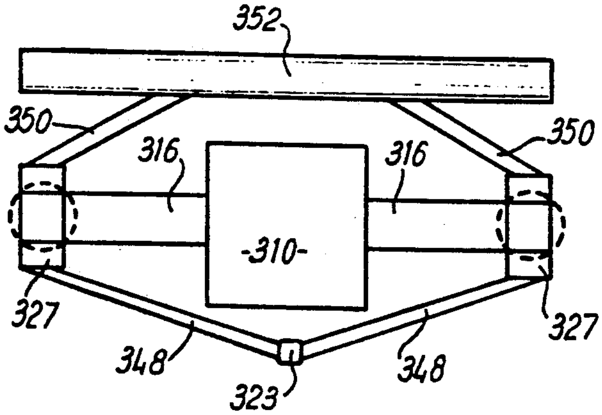
FIG. 10 is a plan view of the fourth embodiment.

Referring now to FIGS. 8, 9 and 10, these show a fourth embodiment which is generally similar in principle to the third embodiment of FIGS. 5, 6 and 7, differing in details of the frame (and in respect of possible modification outlined in FIG. 9). Those parts of the fourth embodiment which correspond to the third embodiment (except possibly for dimensional differences not affecting principles of operation) are given the same reference numerals as for the third embodiment, but prefixed by a "3" ("300"-series reference numerals) in place of a "2" ("200"-series reference numerals); for a full description of any part of the fourth embodiment not detailed below, reference should be made to the description of the corresponding part of the third embodiment.

The frame 320 of the fourth embodiment differs from the frame 220 of the third embodiment in consisting principally of a single-tube upright spine section 323. The lower end of the spine section 323 is resiliently clamped to the bit 312 of the paving breaker 310 by a rubber bush 324. The upper end of the spine section 323 is connected to a crossbar 348. Rearwardly projecting arms 327 on the crossbar 348, and downward extensions 328 of the arms 327, ring downwardly projecting spigots 340 clamped to the breaker handles 316 without directly touching the spigots 240. Compression springs 342 and rubber toroids 346, in conjunction with flanges 344 secured to the spigots 340, perform the same resilient coupling of the breaker handles 316 to the frame 320 as the corresponding parts of the third embodiment.

Arms 350 extend rearwardly and upwardly from the rears of the arms 327 to support a transverse handle 352 incorporating a breaker control valve lever 354, as in the third embodiment.

FIG. 9 schematically outlines an arrangement to facilitate the lifting of the breaker and its frame, and to increase their manoeuvrability. A pneumatic cylinder 360 is attached to the spine section 323, and may form the spine section or a substantial part of it. A piston rod 362 is variably extended downwards from the cylinder 360 under the control of compressed fluid (compressed air or hydraulic oil) in the cylinder 360. The lower end of the piston rod 362 mounts a pair of wheels 364.

When the piston rod 362 is fully extended downwards as shown in chain-dash outline in FIG. 9, the wheels 364 engage the surface of the ground and lift the breaker 310 and its bit 312 off the ground. The wheels 364 allow the breaker 310 to be readily traversed and pivoted while supporting the full weight of the breaker and its frame. A cylinder pressure control valve and its operating lever (not shown) may be incorporated into the handle 352 in a manner similar to the breaker control valve lever 354.

Figure 11:
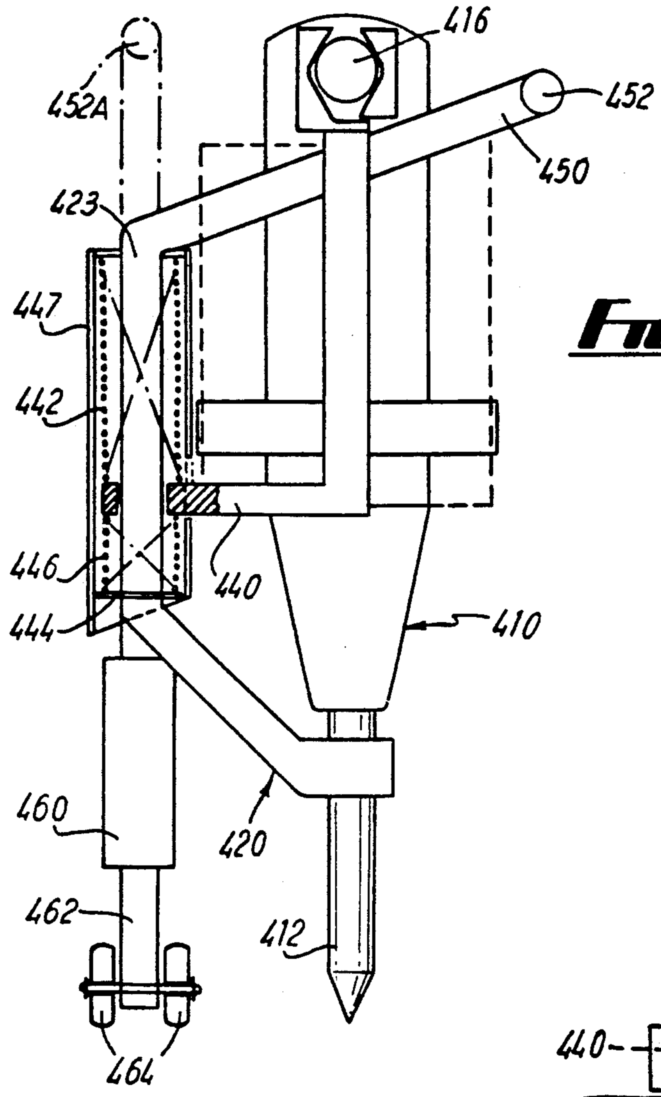
FIG. 11 is a schematic elevation of a fifth embodiment of the invention.
Figure 12:
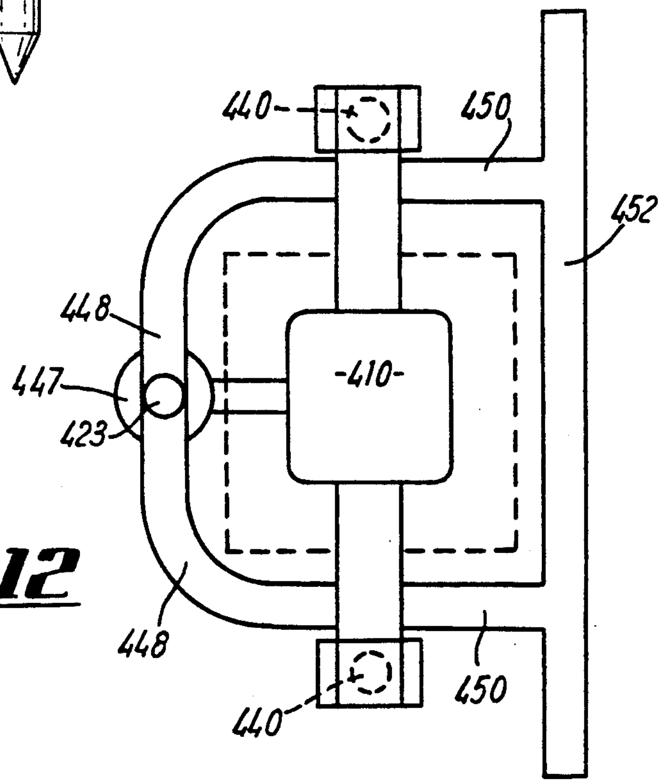
FIG. 12 is a plan view of the fifth embodiment.

Referring now to FIGS. 11 and 12, these schematically depict a fifth embodiment of the invention, which is a development of the fourth embodiment of FIGS. 8, 9 and 10. Those parts of the fifth embodiment which correspond to parts of the fourth embodiment (and possible dimensional differences not affectinq principles of operation) are given the same reference numerals, but prefixed with a "4" ("400"-series of reference numerals) instead of a "3" ("300"-series of reference numerals). For a full description of any part of the fifth embodiment not detailed below, reference should be made to the corresponding part of the third or preceding embodiments.

As in the fourth embodiment, the frame 420 holding the breaker 410 and its bit 412, is based on a single upright spine section 423 resiliently clamped at its lower end to the bit 412, and diverging at its upper end into arms 448 and 450 supporting a transverse handle 452. (An alternative position for the handle 452 is shown in chain-dash outline at 452A). In contrast to the preceding embodiments, the vertical motion of the breaker 410 relative to its frame 420 is accommodated by functional slide and guide parts transferred from the previous spigots 340 (the "slides") and frame extensions 327 (the "guides") to a cranked U-shaped sub-frame 440 (as a "guide") running directly on the upright spine section 423 (as a "slide"). An upper compression spring 442 is the functional equivalent of the spring 342 in the fourth embodiment, while a lower compression spring 446 is the functional equivalent of the rubber toroids 346. These springs 442 and 446, together with the "slide" position of the spine section 423 are covered by a shroud 447.

As in the FIG. 9 modification, the fifth embodiment has a pneumatic (or hydraulic) cylinder 460 secured to the frame 420 as a downward extension of the spine section 423. The piston rod 462 which is controllably extended downwards from the cylinder 460 mounts a pair of wheels 464 at its lower end for ease of movement on the ground when extended.

Figure 13:
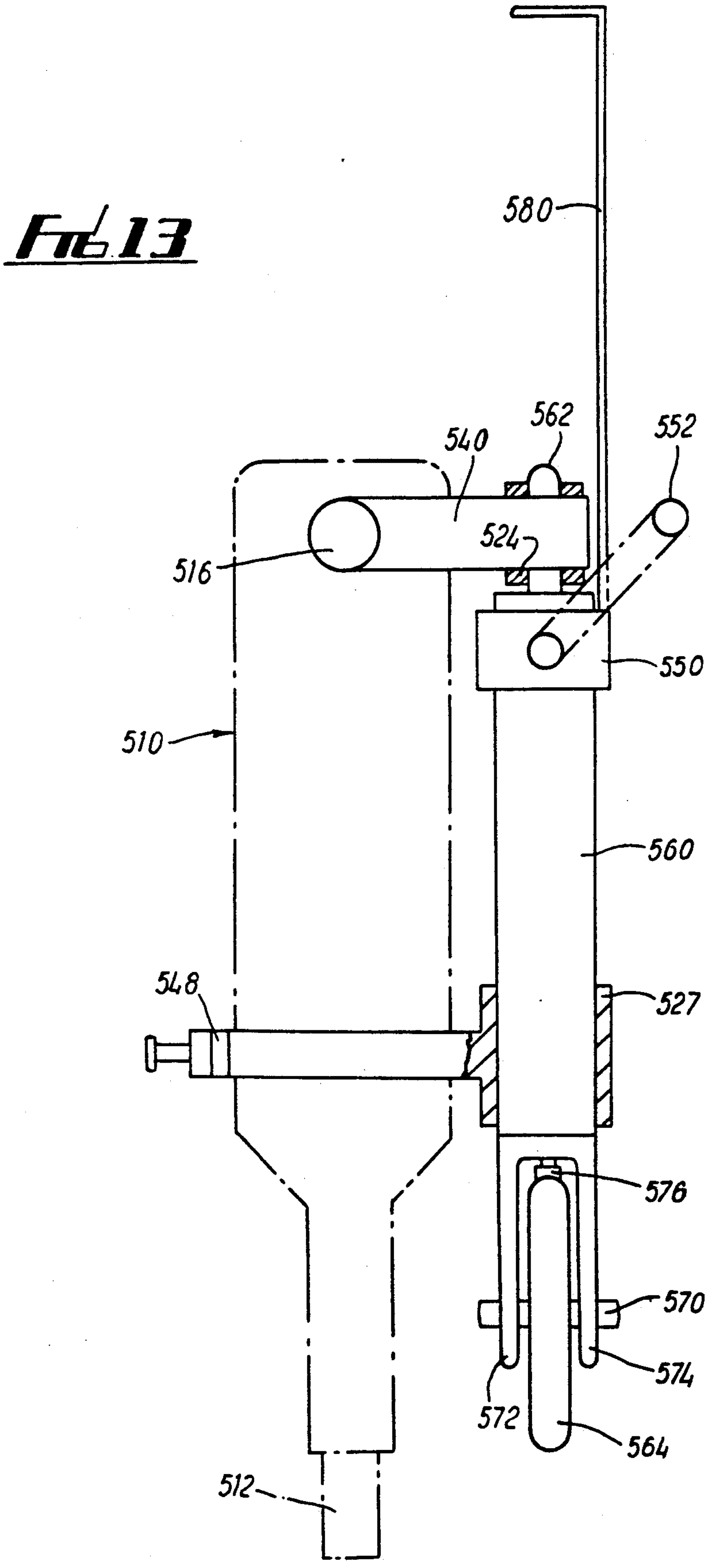
FIG. 13 is a schematic part-sectional elevation of a sixth embodiment of the invention.

FIG. 13 schematically depicts a sixth embodiment of the invention, in which the tool-lifting cylnder 560 is arranged so that its casing forms both a frame spine section and a "slide" for vertical movement. In place of resilient coupling to the breaker bit 512, the breaker handles 516 are coupled through horizontal links 540 and a rubber bush 524 to the top of the piston rod 562.

Referring now to FIG. 13 in greater detail, the sixth embodiment has a frame or body member in the form of a square-section pneumatic cylinder 560 provided with upper and lower fixing brackets 540 and 548, a support wheel 564, and an operator handle 552.

The cylinder 560, which is of aluminium alloy, is hollow and contains a piston mounted on the lower end of a connecting rod 562. Movement of the piston in the cylinder 560 is controlled by pressurised air, introduced through inlets (not shown) provided in the wall of the cylinder 560. In this example, the cylinder has a bore of two and a half inches and the piston has a stroke of fourteen inches.

The upper fixing bracket 540 is mounted on the upper end of the connecting rod 562 and is fixed to the handles 516 provided on the upper end of the pneumatic breaker 510.

The lower fixing bracket 548 is fixed to a lower portion of the breaker 510 and is slidably mounted on the cylinder 560 by means of a sliding collar 527.

The support wheel 564 is mounted on an axle 570 which extends between two forks 572 and 574. The forks 572 and 574 are rotatably mounted about a vertical axis on the lower end of the cylinder 560 and may be locked in any desired rotational position so as to fix the steering direction.

A wheel brake 576 is provided on the cylinder 560 and may be moved into contact with the upper surface of the wheel 564 by pneumatic pressure.

The operator handle 552 extends from a bracket 550 fixed around the upper end portion of the cylinder 560. The handle 552 is provided with twist or lever grip controls with which the operator controls the tool lift cylinder 560 and the breaker 510. In the tool support shown, the left hand control controls the flow of compressed air to the cylinder 560 to raise and lower the piston rod 562 and thus the breaker 510, and the right hand control is used to switch the breaker 510 on and off. A brake lever (not shown) is provided between the left and right hand grips to activate the wheel brake 576.

A plastic guard 580 is fitted to and extends upwardly from the upper portion of the cylinder 560 to protect the operator from, for example, stone chips produced by the action of the breaker bit 512.

In use, the operator may wheel, or carry, the assembly of the tool support and the breaker 510 to the point of use. The support and the breaker 510 are then connected to a pneumatic supply, such as a compressor, and the breaker 510 is positioned and switched on. To apply the bit 512 of the breaker 510 to the surface to be broken the operator retracts the piston and connecting rod 562 into the cylinder 560 such that the wight of both components is supported by the bit 512. When the bit 512 has broken the surface at that point to a desired degree, the operator applies the wheel brake 576 and opens the inlet into the cylinder 560, causing the piston rod 562 to rise and lift the breaker 510 which can then be re-positioned by rolling on the wheel 564.

Figure 14:
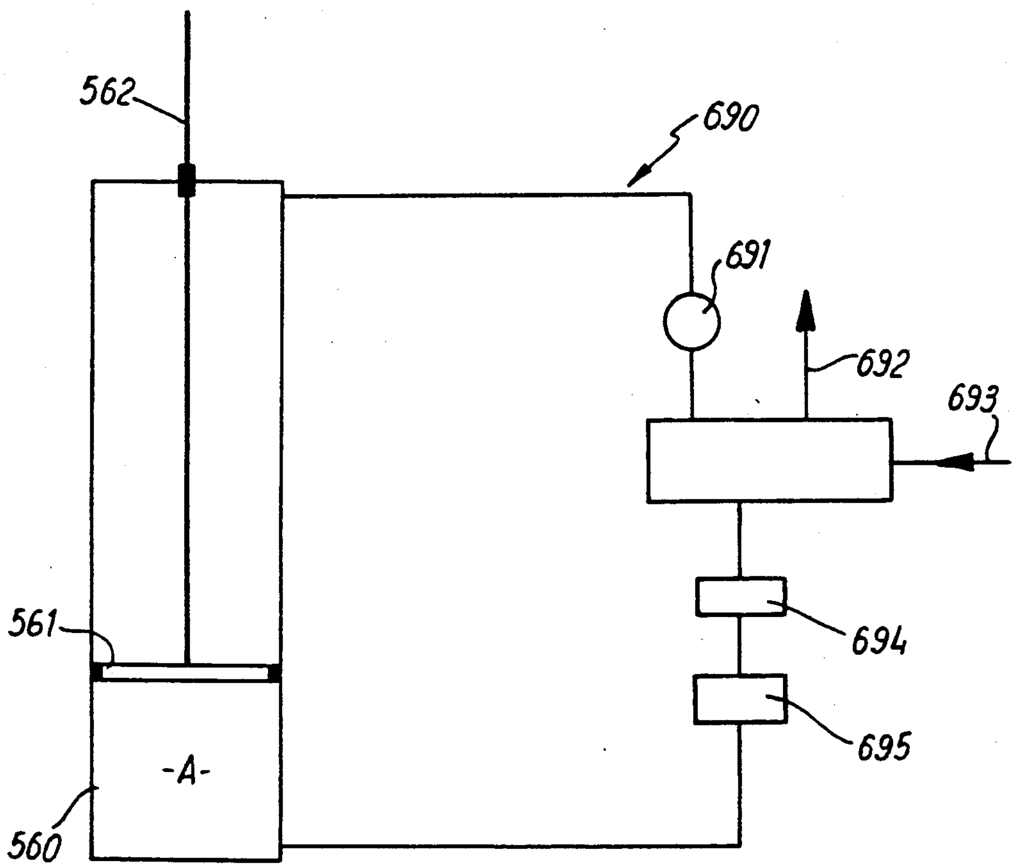
FIG. 14 is a schematic representation of a fluid pressure control circuit for the sixth embodiment.

Sudden movements of the piston in the cylinder 560 are prevented by providing the lift/lower control circuit 690 shown in FIG. 14. The circuit 690 includes a pressure control 691, an exhaust outlet 692, a supply inlet 693, a flow control 694 and an exhauster 695.

A sudden movement of the piston 561 in the cylinder 560, such as would occur when the bit 512 has been pulled free from a surface, is prevented by the flow control 694 which limits the rate of displacement of air in the cylinder 560 to between 0.1 and 1 cubic feet per minute and consequently limits the upward velocity of the piston 561 to between 0.59 and 5.9 inches per second. This is achieved by restricting the flow of air into the lower portion A of the cylinder 560 below the piston 561.

In other embodiments of the tool support, the cylinder 2 may be of a suitable plastics material. Also, further embodiments of the tool support may be provided with two cylinders and two or more wheels. Modifications and improvements may be incorporated without departing from the scope of the invention.

I claim:

1. A paving breaker support comprising a support frame mounted on a body member of a paving breaker, the support frame having ground engaging wheel means mounted thereon for movement longitudinally of the body member selectively extendible to engage the ground such that a working member of the paving breaker is supported clear of the ground or retractable such that said working member engages the ground, said movement of said ground engaging wheel means being effected by powered lifting means under the control of a manually operable control provided on said support frame.

2. A paving breaker support as claimed in claim 1 including damping means by which transmission to a handle of the paving breaker of vibration arising from operation of the paving breaker is inhibited.

3. A paving breaker support as claimed in claim 1 wherein said powered lifting mans comprises a piston-and-cylinder assembly.

4. A paving breaker support as claimed in claim 3 wherein the cylinder constitutes or is integral with said support frame.

5. A paving breaker support as claimed in claim 1 wherein said powered lifting means is provided with a motion damper to inhibit over-rapid movement.

6. A paving breaker support as claimed in claim 5 wherein the motion damper comprises a fluid flow restrictor disposed to act upon operating fluid passing to or from the lifting means.

7. A paving breaker as claimed in claim 1 and including a wheel brake arranged to operate on the ground-engageable wheel to cause controlled braking of said wheel.

8. A paving breaker support as claimed in claim 7 wherein said wheel brake is operable by fluid pressure.

* * * * *